May 31, 1927.
H. D. JONES
1,630,850
MEANS FOR FASTENING SEED DISTRIBUTORS TO METAL HOPPERS
Filed May 10, 1926
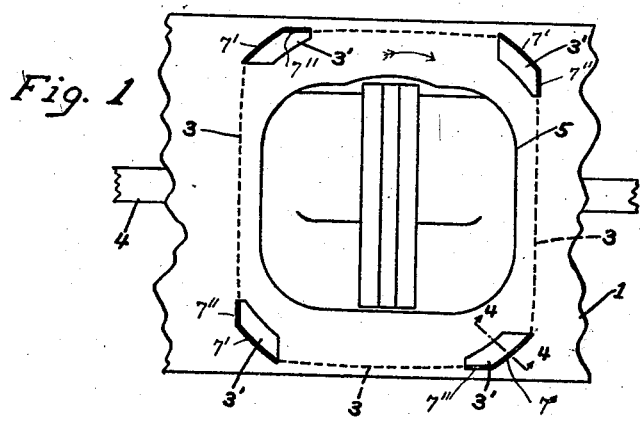
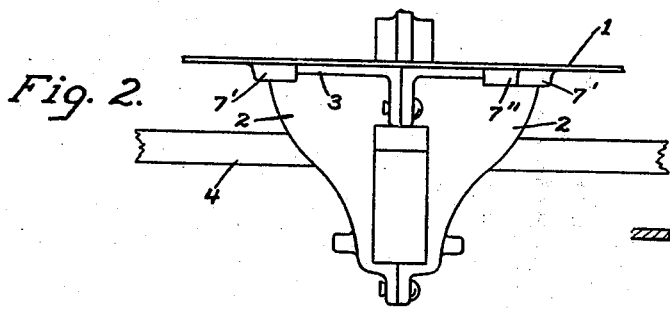
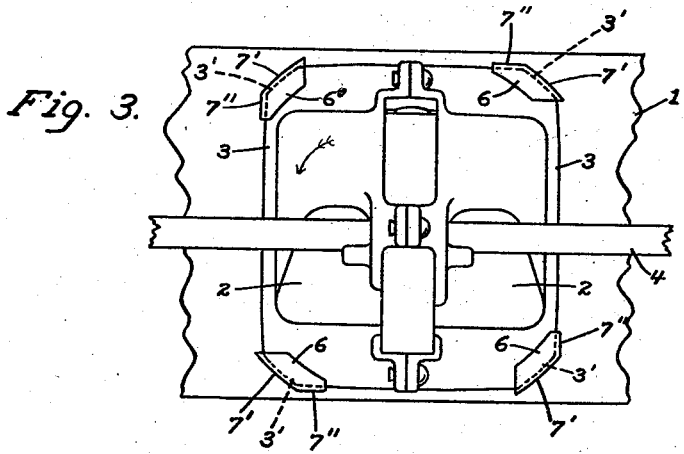
Inventor
Henry D. Jones
By
Bowman
Attorneys Patented May 31, 1927.

1,630,850

UNITED STATES PATENT OFFICE.

HENRY D. JONES, OF SPRINGFIELD, OHIO, ASSIGNOR TO THE AMERICAN SEEDING MACHINE COMPANY, OF SPRINGFIELD, OHIO, A CORPORATION OF OHIO.

MEANS FOR FASTENING SEED DISTRIBUTORS TO METAL HOPPERS.

Application filed May 10, 1926. Serial No. 107,960.

This invention relates to seeding machines, it particularly relating to seeding machines employing metal hoppers and especially to improved means for securing the seed distributors to the hopper bottom.

The object of my invention is to provide simple, inexpensive and effective means for securing the distributors to the metallic bottom of a metal hopper, a more specific object of the invention being to provide an arrangement for securing the distributor to the hopper bottom without the aid of screws or other similar fastening devices.

Referring to the drawings:

Fig. 1 is a top plan view of a portion of the hopper bottom showing one of the seed distributors attached thereto.

Fig. 2 is a rear elevation of the parts shown in Fig. 1.

Fig. 3 is a bottom plan view of the same parts.

Fig. 4 is a section on the line 4—4 of Fig. 1.

Referring to the drawings, 1 represents a portion of the metallic bottom of a metal hopper. The outer casing of a seed distributor of usual form is shown at 2, this casing being preferably in two parts suitably connected together and having at its upper end on all sides thereof a laterally projecting flange 3, the corners of which are preferably rounded as indicated in dotted lines at 3'. As is usual in the seed feeding devices for seeding machines, a feed shaft 4 extends through the casings of the entire series of the seed distributors to drive the feed wheels therein.

The bottom of the hopper is formed with a series of openings, such as the one 5 shown in the drawings, and a feed distributor is secured to the under side of the bottom of the hopper beneath each one of these openings so as to receive the seed from the hopper. In the present case the hopper bottom is formed of sheet metal which can be readily cut and pressed to the desired form. In order to secure the distributors in position, I provide for each distributor a series of shelves arranged to receive the corners of the flange 3 of the distributor casing. These shelves are formed integrally with the metallic hopper bottom by cutting and pressing portions thereof to the required form, preferably at four different points about each opening 5, the metal being so cut and pressed as to provide a horizontal shelf 6 connected to the main body of the hopper bottom by a wall or web. As shown, a portion of this wall, as indicated at 7', is formed on the arc of a circle struck from the center of the opening 5, while another portion of the wall indicated at 7", is formed on a straight line which will lie parallel with the edge of the flange 3 of the distributor casing when this casing has been attached to the hopper bottom.

In applying the distributor, the distributor is turned at a slight angle to its normal position on the hopper bottom so that one end of each of its rounded corners will lie coincident with that end of the corresponding shelf opposite to the straight wall 7". By then turning the distributor in the direction of the arrows, the rounded corners of the flange 3 ride upon the shelves 6 until the flange 3 contacts with the straight walls 7", which act as stops to correctly position the distributor. After all the distributors have been positioned on the hopper bottom, the feed shaft 4 is inserted through the distributor casings and acts to prevent the distributor casings from turning upon the shelves and thereby holds the distributors in position. The shelves 6 and walls 7' and 7" are so formed that the distributor flanges will have a comparatively snug fit therein, requiring the distributors to be forced to position, the shelves and walls, being of sheet metal, yielding to a certain extent if necessary, thereby serving to hold the distributors firmly in position and prevent rattling.

Having thus described my invention, I claim:

1. The combination, with a metal hopper bottom having an opening, and a feed distributor casing flanged at its upper end, of means for securing said distributor casing to the under side of said hopper bottom in line with said opening consisting of shelves formed on the under side of said hopper bottom about said opening arranged to be engaged by the flange of said casing by a partial rotation of said casing to secure the flange wholly to the lower surface of said hopper bottom.

2. The combination, with a sheet metal hopper bottom having an opening and a distributor casing having a flanged upper end, of a plurality of depressed shelves formed from the metal of the hopper bottom about said opening and arranged to receive the corners of the distributor flange to support said distributor.

3. The combination, with a sheet metal hopper bottom having an opening and a distributor casing having a flanged upper end, of a plurality of depressed shelves formed from the metal of the hopper bottom about said opening, each shelf being connected to the hopper bottom by an integral wall, a portion of which is shaped to form a stop for said flange.

4. The combination, with a sheet metal hopper bottom having an opening and a distributor casing having a flanged upper end, of a plurality of depressed shelves formed from the metal of the hopper bottom about said opening, each shelf being connected to the hopper bottom by an integral wall, a portion of which is formed to permit a partial rotation of the distributor flange on the shelf and another portion shaped to form a stop for said flange.

5. The combination, with a sheet metal hopper bottom having an opening and a distributor casing having a flanged upper end, of a plurality of depressed shelves formed from the metal of the hopper bottom about said opening, each shelf being connected to the hopper bottom by an integral wall, a portion of which is formed on the arc of a circle struck from the center of the hopper opening and another portion extended on a line parallel with the distributor flange when said distributor is assembled with the hopper bottom.

In testimony whereof, I have hereunto set my hand this 8th day of May, 1926.

HENRY D. JONES.